(12) United States Patent
Kim et al.

(10) Patent No.: US 11,245,160 B2
(45) Date of Patent: Feb. 8, 2022

(54) SECONDARY BATTERY AND METHOD FOR MANUFACTURING THE SAME

(71) Applicant: LG Chem, Ltd., Seoul (KR)

(72) Inventors: Sang Jih Kim, Daejeon (KR); Sang Baek Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 107 days.

(21) Appl. No.: 16/620,380

(22) PCT Filed: Nov. 5, 2018

(86) PCT No.: PCT/KR2018/013320
§ 371 (c)(1),
(2) Date: Dec. 6, 2019

(87) PCT Pub. No.: WO2019/103351
PCT Pub. Date: May 31, 2019

(65) Prior Publication Data
US 2020/0287193 A1 Sep. 10, 2020

(30) Foreign Application Priority Data
Nov. 21, 2017 (KR) .................. 10-2017-0155444

(51) Int. Cl.
*H01M 50/463* (2021.01)
*H01M 10/04* (2006.01)
*H01M 50/10* (2021.01)

(52) U.S. Cl.
CPC ..... *H01M 50/463* (2021.01); *H01M 10/0459* (2013.01); *H01M 50/10* (2021.01)

(58) Field of Classification Search
CPC ............. H01M 50/463; H01M 50/466; H01M 10/0459; H01M 10/045
See application file for complete search history.

(56) References Cited

U.S. PATENT DOCUMENTS

2011/0097615 A1 4/2011 Goh et al.
2011/0183183 A1 7/2011 Grady et al.
(Continued)

FOREIGN PATENT DOCUMENTS

JP 5018855 B2 9/2012
JP 2017-117776 A 6/2017
(Continued)

OTHER PUBLICATIONS

English Translation of WO 2016056776, Battery Cell including battery case formed in ashape corresponding . . . , 2016, LG Chem (Year: 2016).*

(Continued)

*Primary Examiner* — Maria Laios
*Assistant Examiner* — Adam J Francis
(74) *Attorney, Agent, or Firm* — Birch, Stewart, Kolasch & Birch, LLP

(57) ABSTRACT

A secondary battery and a method for manufacturing the same are provided. An electrode assembly accommodated in the secondary battery having various shapes is manufactured. In particular, a method for manufacturing a secondary battery includes an electrode stack preparation step of preparing an electrode stack which includes a first unit cell having a first area and a second unit cell having a second area that is less than the first area, and which has a structure in which the second unit cell is disposed on one surface of the first unit cell. The method further includes a curved surface formation step of pressing at least a part of an independent portion, which does not overlap the second unit cell, of the first unit cell to form a curved surface on the at least the part of the independent portion.

7 Claims, 4 Drawing Sheets

(56) References Cited

U.S. PATENT DOCUMENTS

| | | | |
|---|---|---|---|
| 2014/0050958 A1* | 2/2014 | Kwon | H01M 10/0431 429/94 |
| 2014/0087224 A1 | 3/2014 | Kim et al. | |
| 2014/0090236 A1 | 4/2014 | Goh et al. | |
| 2014/0093762 A1 | 4/2014 | Goh et al. | |
| 2014/0120397 A1 | 5/2014 | Kim et al. | |
| 2014/0234679 A1* | 8/2014 | Kim | H01M 50/449 429/94 |
| 2014/0315074 A1 | 10/2014 | Kong | |
| 2015/0200418 A1 | 7/2015 | Grady et al. | |
| 2015/0288021 A1 | 10/2015 | Kwon et al. | |
| 2015/0318579 A1 | 11/2015 | Kwon et al. | |
| 2016/0372781 A1* | 12/2016 | Kwon | H01M 10/0445 |
| 2017/0084957 A1 | 3/2017 | Kwon et al. | |
| 2017/0092906 A1 | 3/2017 | Park et al. | |
| 2017/0117511 A1 | 4/2017 | Takahashi et al. | |
| 2018/0076442 A1 | 3/2018 | Choi et al. | |
| 2019/0020053 A1 | 1/2019 | Kwon et al. | |
| 2019/0088979 A1 | 3/2019 | Grady et al. | |
| 2019/0326563 A1 | 10/2019 | Takahashi et al. | |

FOREIGN PATENT DOCUMENTS

| | | |
|---|---|---|
| KR | 10-2009-0097731 A | 9/2009 |
| KR | 10-2013-0021354 A | 3/2013 |
| KR | 10-2013-0132341 A | 12/2013 |
| KR | 10-2013-0135017 A | 12/2013 |
| KR | 10-2013-0135129 A | 12/2013 |
| KR | 10-1414092 B1 | 7/2014 |
| KR | 10-2014-0101510 A | 8/2014 |
| KR | 10-2015-0062738 A | 6/2015 |
| KR | 10-2015-0092854 A | 8/2015 |
| KR | 10-2015-0108731 A | 9/2015 |
| KR | 10-2016-0074209 A | 6/2016 |
| KR | 10-2017-0000368 A | 1/2017 |
| WO | WO-2016056776 A1 * | 4/2016 .......... H01M 10/058 |

OTHER PUBLICATIONS

Extended European Search Report for European Application No. 18880676.4, dated Apr. 17, 2020.

* cited by examiner

SECONDARY BATTERY AND METHOD FOR MANUFACTURING THE SAME

CROSS-REFERENCE TO RELATED APPLICATION

The present application is a U.S. National Phase of PCT International Application No. PCT/KR2018/013320 with an International Filing Date of Nov. 5, 2018, which claims the benefit under 35 U.S.C. § 119(a) the benefit of Korean Patent Application No. 10-2017-0155444, filed on Nov. 21, 2017, the entire contents of which are incorporated by reference herein.

TECHNICAL FIELD

The present invention relates to a secondary battery and a method for manufacturing the same, and more particularly, to a secondary battery having an improved degree of freedom in shape in comparison to a secondary battery according to the related art and a method for manufacturing the same.

BACKGROUND ART

As the shape and type of electronic equipment that accommodates a secondary battery that is repeatedly chargeable and dischargeable are diversified, shapes required for the secondary battery are also diversified. Particularly, with the tendency of the miniaturization and large capacity of the electronic equipment, it is required that the shapes of the secondary batteries are also diversified.

In other words, as the electronic equipment is miniaturized, the secondary battery is required to be conformable in shape to maintain the capacity of the secondary battery accommodated in the electronic equipment even when the electronic equipment is miniaturized. Further, the secondary battery is required to be diversified in shape to utilize an internal space of the electronic equipment, which has been unable to be utilized conventionally, thereby increasing the capacity of the secondary battery.

An electrode assembly having a structure in which an electrode and a separator are alternately stacked is accommodated in the secondary battery. Thus, since the diversity in shape of the secondary battery is required, it is necessary also to improve the diversity in shape of the electrode assembly.

DISCLOSURE OF THE INVENTION

Technical Problem

Therefore, an object of the present invention is to manufacture an electrode assembly accommodated in a secondary battery having more various shapes in comparison with a secondary battery according to the related art.

Technical Solution

To achieve the above object, according to a first aspect of the prevent invention, a method for manufacturing an electrode assembly includes an electrode stack preparation step of preparing an electrode stack which includes a first unit cell having a first area and a second unit cell having a second area that is less than the first area. The electrode stack has a structure in which the second unit cell is disposed on one surface of the first unit cell. The method further includes a curved surface formation step of pressing at least a part of an independent portion, which does not overlap the second unit cell, of the first unit cell to form a curved surface on the at least the part of the independent portion.

The electrode stack preparation step may include manufacturing the first unit cell having the first area by stacking a plurality of first sub cells after manufacturing the plurality of first sub cells, each of which is manufactured by stacking an electrode and a separator. The electrode stack preparation step may further include manufacturing the second unit cell having the second area by stacking a plurality of second sub cells after manufacturing the plurality of second sub cells, each of which is manufactured by stacking the electrode and the separator.

The electrode stack preparation step may include manufacturing the first unit cell comprising a first sub cell having a structure in which a first separation film is folded after an electrode and a separator are disposed on the first separation film, and manufacturing the second unit cell including a second sub cell having a structure in which a second separation film is folded after the electrode and the separator are disposed on the second separation film.

Each of the first sub cell and the second sub cell may be a bi-cell.

To achieve the above object, according to a second aspect of the prevent invention, a secondary battery includes a first unit cell having a first area and a second unit cell having a second area that is less than the first area. The second unit cell is disposed on one surface of the first unit cell, and a curved surface is formed on at least a part of an independent portion, which does not overlap the second unit cell, of the first unit cell.

The first unit cell may include a first sub cell having a structure in which an electrode and a separator are alternately stacked, and the second unit cell may include a second sub cell having the structure in which the electrode and the separator are alternately stacked.

The first unit cell may include a first sub cell having a structure in which a first separation film is folded after an electrode and a separator are disposed on the first separation film, and the second unit cell may include a second sub cell having a structure in which a second separation film is folded after the electrode and the separator are disposed on the first separation film.

To achieve the above object, according to a third aspect of the prevent invention, a method for manufacturing a secondary battery includes an electrode stack preparation step of preparing an electrode stack which includes a first unit cell having a first area and a second unit cell having a second area that is less than the first area, and the electrode stack has a structure in which the second unit cell is disposed on one surface of the first unit cell. The method further includes an accommodation step of accommodating the electrode stack in a pouch-type exterior having an internal space that corresponds to a shape of the electrode stack, and a curved surface formation step of pressing at least a part of an independent portion of the first unit cell, which does not overlap the second unit cell, on an outer surface of the pouch-type exterior in which the electrode stack is accommodated.

To achieve the above object, according to a fourth aspect of the prevent invention, a secondary battery includes a first unit cell having a first area, a second unit cell having a second area that is less than the first area and disposed on the one surface of the first unit cell, and a pouch-type exterior that accommodates the first unit cell and the second unit cell and has the internal space that corresponds to the shape of the first unit cell and the second unit cell. A curved surface is formed on at least a part of an independent portion, which does not overlap the second unit cell, of the first unit cell.

Advantageous Effects

According to the present invention, the electrode assembly accommodated in the secondary battery having more various shape in comparison with the secondary battery according to the related art may be manufactured.

MODE FOR CARRYING OUT THE INVENTION

Hereinafter, a method for manufacturing an electrode assembly according to an embodiment of the present invention will be described with reference to the accompanying drawings.

Method for Manufacturing Electrode Assembly

Figure 1:
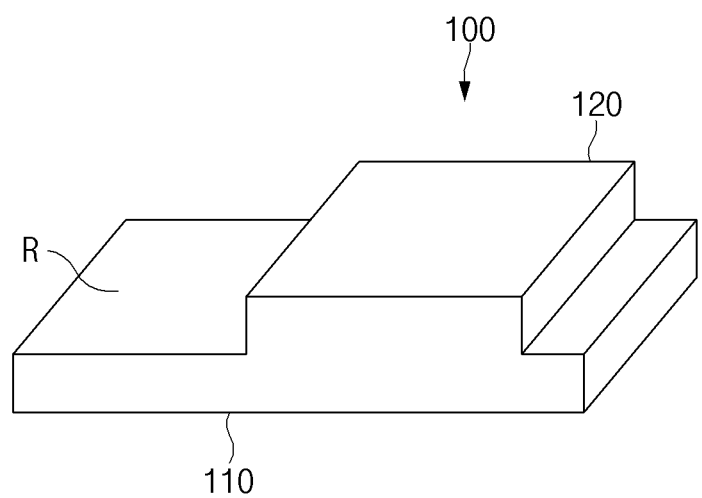
FIG. 1 is a perspective view of an electrode stack manufactured in an intermediate process when an electrode assembly is manufactured according to an embodiment of the present invention.

FIG. 1 is a perspective view of an electrode stack manufactured in an intermediate process when an electrode assembly is manufactured according to an embodiment of the present invention.

A method for manufacturing an electrode assembly according to an embodiment of the present invention may include a step of manufacturing a first unit cell having a first area and having a structure in which an electrode and a separator are alternately disposed, and a step of manufacturing a second unit cell having a second area and having a structure in which an electrode and a separator are alternately disposed. In particular, the second area may be less than the first area, and each of the electrode and the separator may have a flat plate shape.

In this specification, that the first cell has the first area may mean that the first unit cell has an area that correspond to the first area when viewed from an upper or lower side of the first unit cell while the electrode and the separator that constitute the first unit cell are vertically stacked.

Additionally, the plate-shaped electrode and the plate-shaped separator, which constitute the second unit cell, may have areas different from each other. Thus, in this specification, that the second cell has the second area may mean that the second unit cell has an area that corresponds to the second area when viewed from an upper or lower side of the second unit cell while the electrode and the separator that constitute the second unit cell are vertically stacked.

Further, as illustrated in FIG. 1, the method for manufacturing the electrode assembly according to an embodiment of the present invention may include an electrode stack preparation step of preparing an electrode stack which includes the first unit cell having the first area and the second unit cell having the second area, and which has a structure in which the second unit cell is disposed on one surface of the first unit cell. FIG. 1 illustrates an electrode stack 100 after the electrode stack preparation step. As described above, since the second area is less than the first area, a stepped portion may be formed on the electrode stack 100 as illustrated in FIG. 1.

As described above, since the stepped portion is formed on the electrode stack 100, a surface, which faces the second unit cell 120, among surfaces of the first unit cell 110 may be divided into a portion that overlaps the second unit cell 120 and a portion that does not overlap the second unit cell 120. In this specification, the portion that does not overlap the second unit cell 120, of the surface of the first unit cell 110 facing the second unit cell 120 is referred to as an 'independent portion'. Although there are two independent portions in the electrode stack 100 of FIG. 1, for convenience of description, the relatively larger independent portion of the two independent portions is denoted by a reference symbol R, and also, the relatively larger independent portion will be mainly described.

Thus, the method for manufacturing the electrode assembly according to an embodiment of the present invention may include a curved surface formation step of pressing at least a part of the independent portion R that does not overlap the second unit cell 120, of the first unit cell 110 to form a curved surface C (see FIG. 2) on at least a part of the independent portion R. For convenience of description, a structure, which does not have the curved surface, of the electrode-stacked structure including the first unit cell and the second unit cell is referred to as an 'electrode stack', and the structure having the curved surface is referred to as an 'electrode assembly'.

Figure 2:
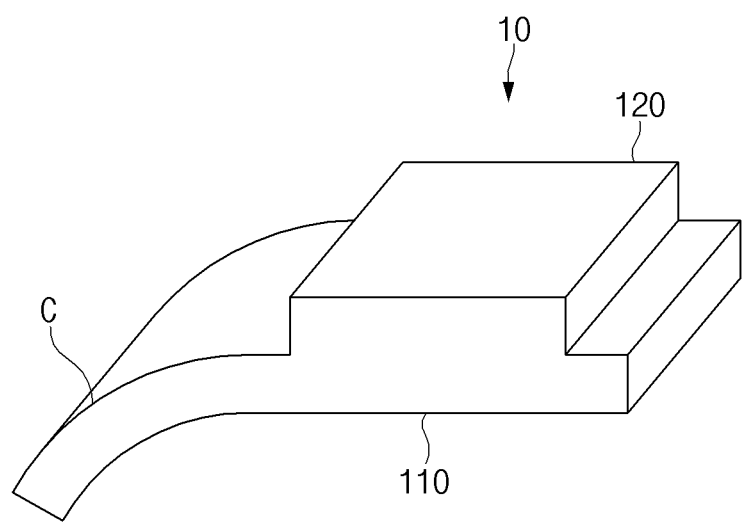
FIG. 2 is a perspective view of the electrode assembly according to an embodiment of the present invention.

As illustrated in FIG. 2, in the curved surface formation step, the curved surface C may be formed over one entire independent portion R. Alternatively, the curved surface may be formed on a part of the one independent portion. Further, when a plurality of independent portions are formed on the electrode stack, the curved surface may be formed on each of the independent portions or may be formed on a part of the plurality of independent portions.

As illustrated in FIG. 2, in the curved surface formation step, the curved surface C may be formed on both of an upper surface and a lower surface of the entire independent portion R. Thus, in the curved surface formation step, the curved surface C may be formed to have a shape in which the independent portion R is bent downward as illustrated in FIG. 2. On the other hand, in the curved surface formation step, the curved surface C may be formed to have a shape in which the independent portion is bent upward.

The first unit cell and the second unit cell according to the present invention may have various structures. For example, a sub cell having a structure in which the electrode and the separator are alternately stacked may be manufactured first, and subsequently, the sub cells may be stacked to manufacture the first unit cell and the second unit cell.

Figure 3:
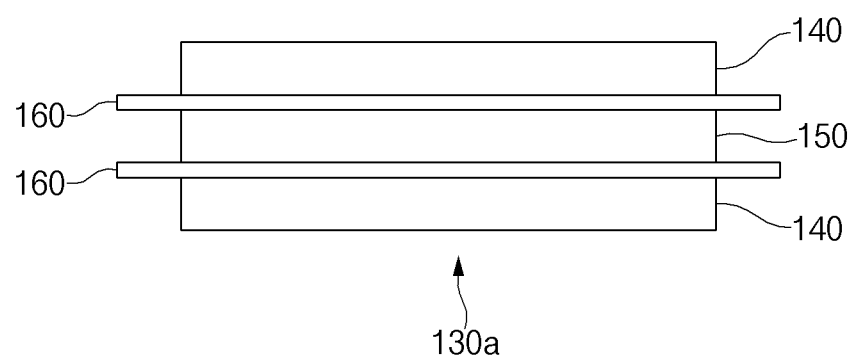
FIG. 3 is a side view illustrating an example of a sub cell constituting the electrode assembly according to an embodiment of the present invention.
Figure 4:
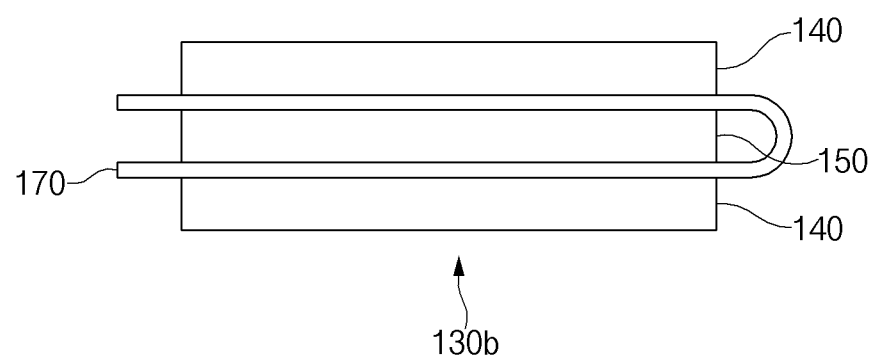
FIG. 4 is a side view illustrating another example of the sub cell constituting the electrode assembly according to an embodiment of the present invention.

FIG. 3 is a side view illustrating an example of a sub cell constituting the electrode assembly according to an embodiment of the present invention, and FIG. 4 is a side view illustrating another example of the sub cell constituting the electrode assembly according to an embodiment of the present invention.

As illustrated in FIG. 3, a sub cell 130a has a structure in which a first electrode 140, a separator 160, and a second electrode 150 are alternately stacked. The first electrode 140 may have a polarity different from a polarity of the second electrode 150. FIG. 3 illustrates a bi-cell, in which the outermost electrodes have the same polarity, as an example of the sub cell 130a.

Based on the above description, in the method for manufacturing the electrode assembly according to an embodiment of the present invention, the electrode stack preparation step may include a process of manufacturing a first unit cell having a first area by stacking a plurality of first sub cells after manufacturing the plurality of first sub cells, each of which is manufactured by alternately stacking an electrode and a separator. Similarly, the electrode stack preparation step may include a process of manufacturing a second unit cell having a second area by stacking a plurality of second sub cells after manufacturing the plurality of second sub cells, each of which is manufactured by alternately stacking an electrode and a separator.

As illustrated in FIG. 4, a sub cell 130b may have a structure in which a separation film 170 is folded, and the first electrode 140 and the second electrode 150 are respectively disposed in a region between the folded separation film 170 and on the outermost surface of the separation film. In particular, the first electrode 140 may have a polarity different from a polarity of the second electrode 150. FIG. 4 illustrates a bi-cell, in which the outermost electrodes have the same polarity, as an example of the sub cell 130b. Although the separation film 170 is folded once in FIG. 4, the sub cell 130b may have a structure in which the separation film 170 is folded two or more times.

Based on the above description, in the method for manufacturing the electrode assembly according to an embodiment of the present invention, the electrode stack preparation step may include a process of manufacturing a first unit cell including the first sub cell having the structure in which the first separation film is folded after the electrode and the separator are disposed on the first separation film. Similarly, the electrode stack preparation step may include a process of manufacturing a second unit cell including the second sub cell having the structure in which the second separation film is folded after the electrode and the separator are disposed on the second separation film.

Hereinafter, the electrode assembly according to an embodiment of the present invention will be described based on the accompanying drawings and the above-described contents.

Electrode Assembly

As illustrated in FIG. 2, an electrode assembly 10 according to an embodiment of the present invention may include a first unit cell 110 having a first area and a second unit cell 120 having a second area, which is less than the first area. The second unit cell 120 may be disposed on one surface of the first unit cell 110, and a curved surface C may be formed on at least a part of an independent portion R (see FIG. 1), which does not overlap the second unit cell 120, of the first unit cell 110.

As described above, each of the first unit cell and the second unit cell may include a plurality of sub cells 130a, each of which has a structure in which an electrode and a separator are alternately stacked, as illustrated in FIG. 3.

On the other hand, each of the first unit cell and the second unit cell may include a sub cell 130b having a structure in which a first separation film is folded after stacking an electrode and a separator on a first separation film and a second separation film as illustrated in FIG. 4.

Secondary Battery and Method for Manufacturing Secondary Battery

According to an embodiment of the present invention, a step of accommodating the electrode assembly based on the above description into a pouch-type exterior may be further performed.

In other words, a method for manufacturing a secondary battery according to an embodiment of the present invention may include an electrode stack preparation step of preparing an electrode stack which includes a first unit cell having a first area and a second unit cell having a second area that is less than the first area, and which has a structure in which the second unit cell is disposed on one surface of the first unit cell, a curved surface formation step of pressing at least a part of an independent portion, which does not overlap the second unit cell, of the first unit cell to manufacture an electrode assembly in which a curved surface is formed on at least a part of the independent portion, and an accommodation step of accommodating the electrode assembly in a pouch-type exterior having an internal space that corresponds to a shape of the electrode assembly having the curved surface.

Thus, the secondary battery according to an embodiment of the present invention includes the first unit cell having the first area, the second unit cell having the second area that is less than the first area and disposed on the one surface of the first unit cell, and the pouch-type exterior that accommodates the first unit cell and the second unit cell and has the internal space corresponding to the shape of each of the first unit cell and the second unit cell. The curved surface may be formed on at least a part of the independent portion, which does not overlap the second unit cell, of the first unit cell.

However, the chronological order of the curved surface formation step and the accommodation step may be changed. In other words, the step of accommodating the electrode assembly (or the electrode stack) in the pouch-type exterior may be performed first, and subsequently, the curved surface formation step may be performed.

Accordingly, a method for manufacturing a secondary battery according to another embodiment of the present invention may include an electrode stack preparation step of preparing an electrode stack which includes a first unit cell having a first area and a second unit cell having a second area that is less than the first area, and which has a structure in which the second unit cell is disposed on one surface of the first unit cell, an accommodation step of accommodating the electrode stack in a pouch-type exterior having an internal space that corresponds to a shape of the electrode stack, and a curved surface formation step of pressing at least a part of an independent portion of the first unit cell, which does not overlap the second unit cell, on an outer surface of the pouch-type exterior in which the electrode stack is accommodated.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing a secondary battery, the method comprising:
  an electrode stack preparation step of preparing an electrode stack which comprises a first unit cell having a first area and a second unit cell having a second area that is less than the first area, wherein the electrode stack has a structure in which the second unit cell is disposed on one surface of the first unit cell, and wherein the first unit cell and the second unit cell are flat; and
  after the electrode stack preparation step, a curved surface formation step of pressing at least a part of an independent portion, which does not overlap the second unit cell, of the first unit cell to manufacture an electrode assembly in which a curved surface is formed on the at least the part of the independent portion.

2. The method of claim 1, further comprising an accommodation step of accommodating the electrode assembly in a pouch-type exterior having an internal space that corresponds to a shape of the electrode assembly having the curved surface.

3. The method of claim 1, wherein the electrode stack preparation step comprises:
manufacturing the first unit cell having the first area by stacking a plurality of first sub cells after manufacturing the plurality of first sub cells, each of which is manufactured by stacking an electrode and a separator; and
manufacturing the second unit cell having the second area by stacking a plurality of second sub cells after manufacturing the plurality of second sub cells, each of which is manufactured by stacking the electrode and the separator.

4. The method of claim 1, wherein the electrode stack preparation step comprises:
manufacturing the first unit cell comprising a first sub cell having a structure in which a first separation film is folded after an electrode and a separator are disposed on the first separation film; and
manufacturing the second unit cell comprising a second sub cell having a structure in which a second separation film is folded after the electrode and the separator are disposed on the second separation film.

5. The method of claim 3, wherein each of the first sub cells and the second sub cells is a bi-cell.

6. The method of claim 4, wherein each of the first sub cell and the second sub cell is a bi-cell.

7. A method for manufacturing a secondary battery, the method comprising:
an electrode stack preparation step of preparing an electrode stack which comprises a first unit cell having a first area and a second unit cell having a second area that is less than first area, wherein the electrode stack has a structure in which the second unit cell is disposed on one surface of the first unit cell;
an accommodation step of accommodating the electrode stack in a pouch-type exterior having an internal space that corresponds to a shape of the electrode stack; and
a curved surface formation step of pressing at least a part of an independent portion of the first unit cell, which does not overlap the second unit cell, on an outer surface of the pouch-type exterior within which the electrode stack is accommodated.

* * * * *